United States Patent [19]
Fritz

[11] Patent Number: 5,456,184
[45] Date of Patent: Oct. 10, 1995

[54] LATERAL ENERGY ABSORBING DEVICE FOR SLOT GUIDED VEHICLE

[75] Inventor: Edward B. Fritz, Valencia, Calif.

[73] Assignee: The Walt Disney Company, Burbank, Calif.

[21] Appl. No.: 109,174

[22] Filed: Aug. 19, 1993

[51] Int. Cl.$^6$ ....................................... B61F 13/00
[52] U.S. Cl. .................. 104/139; 104/53; 105/171; 180/131
[58] Field of Search ................... 104/53, 139, 140; 105/72.2, 157.1, 171; 180/131, 140; 280/91, 168

[56] References Cited

U.S. PATENT DOCUMENTS

| | | |
|---|---|---|
| 717,457 | 12/1902 | Schofield . |
| 788,886 | 5/1905 | Citron . |
| 794,511 | 7/1905 | Knapp . |
| 858,624 | 7/1907 | Reckweg . |
| 1,311,703 | 7/1919 | Meyer . |
| 1,352,969 | 9/1920 | Kalix . |
| 1,571,434 | 2/1926 | Ray . |
| 1,721,353 | 5/1929 | Meling . |
| 1,840,988 | 1/1932 | Traver .................................. 104/53 X |
| 1,890,137 | 12/1932 | Traver . |
| 2,058,279 | 10/1936 | Watkins . |
| 2,135,230 | 11/1938 | Courtney . |
| 2,196,093 | 4/1940 | Bartlett . |
| 2,685,003 | 7/1954 | Barnes . |
| 2,718,194 | 9/1955 | Ruhlmann . |
| 3,006,286 | 10/1961 | Bacon . |
| 3,067,697 | 12/1962 | Doolittle . |
| 3,113,528 | 12/1963 | Morgan . |
| 3,410,223 | 11/1968 | Miller ................... 104/139 X |
| 3,554,130 | 4/1968 | Broggie . |
| 3,590,743 | 3/1969 | Larson . |
| 3,672,308 | 6/1972 | Segar . |
| 3,704,027 | 11/1972 | Laudadio . |
| 3,916,798 | 11/1975 | Ishii et al. .............. 104/139 X |
| 4,246,848 | 1/1981 | Schneider . |
| 4,491,073 | 1/1985 | Dozer . |
| 5,016,540 | 5/1991 | Barber ................... 104/139 X |
| 5,134,940 | 8/1992 | Fujita et al. ............. 104/140 X |

FOREIGN PATENT DOCUMENTS

| | | |
|---|---|---|
| 455464 | 3/1949 | Canada . |
| 759062 | 9/1980 | U.S.S.R. .................. 180/131 |
| 1331678 | 9/1973 | United Kingdom ............ 180/131 |
| 8800544 | 1/1988 | WIPO ....................... 180/131 |

Primary Examiner—Robert J. Oberleitner
Assistant Examiner—S. Joseph Morano
Attorney, Agent, or Firm—Pretty, Schroeder, Brueggemann & Clark

[57] ABSTRACT

A lateral energy absorbing device for an amusement ride vehicle includes a vehicle chassis with a driver for moving the vehicle along a path, and a vehicle body having an area for holding one or more passengers. Appropriate steering mechanisms are provided to permit lateral motion of the vehicle with respect to the path. The lateral energy absorbing device comprises an actuator having one end pivotally connected to the chassis and another end pivotally connected to a follower apparatus adapted to follow a predetermined route along the path. The actuator includes an energy absorber for limiting the lateral travel of the vehicle and for absorbing lateral kinetic energy of the vehicle when its lateral motion with respect to the path reaches or exceeds a predetermined distance.

13 Claims, 9 Drawing Sheets

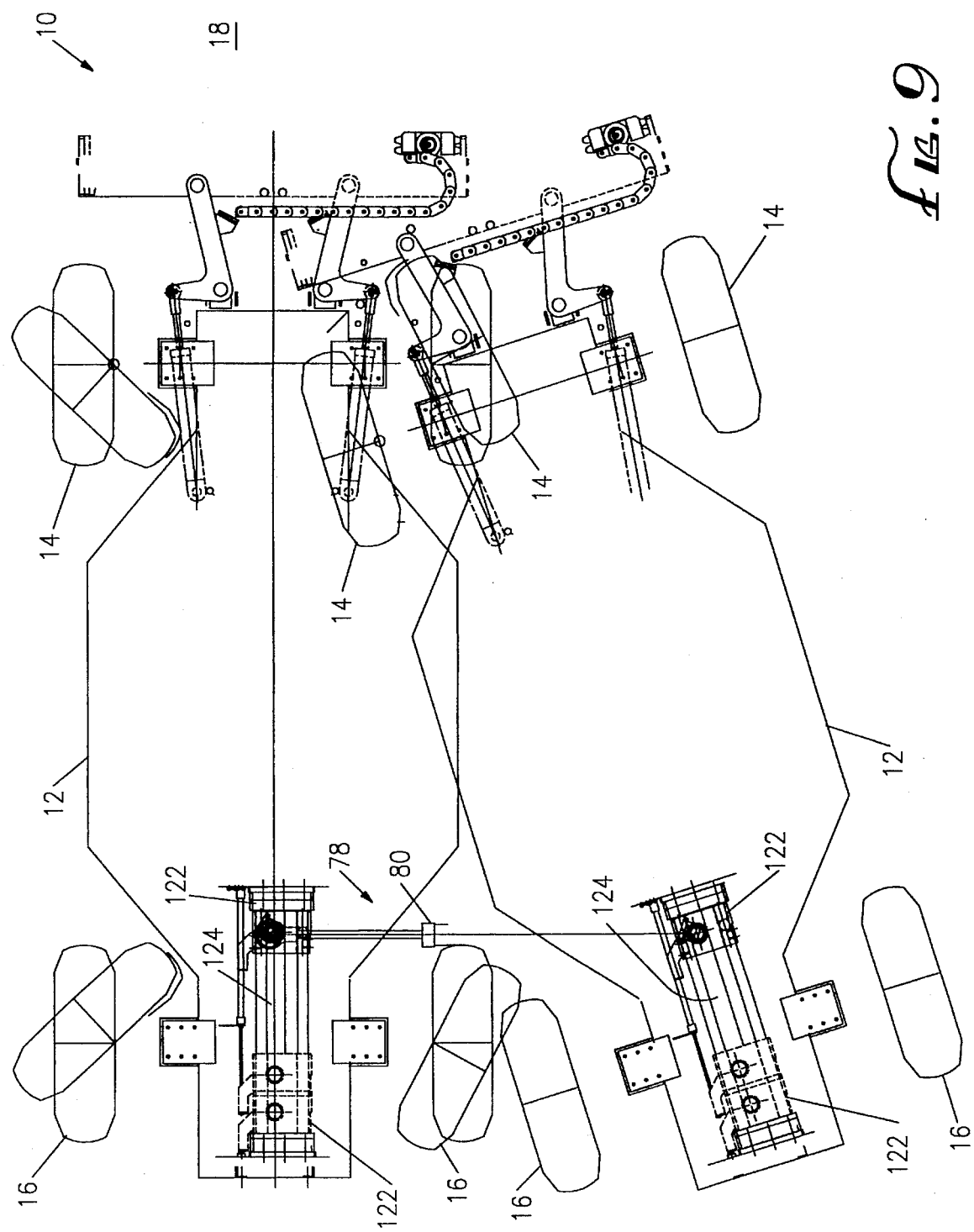

LATERAL ENERGY ABSORBING DEVICE FOR SLOT GUIDED VEHICLE

BACKGROUND OF THE INVENTION

The present invention relates to energy absorbing devices for vehicles and, more particularly, to a lateral energy absorbing device for an amusement ride vehicle.

Ride vehicles have been a common form of entertainment for decades in amusement parks all across the country. A typical form of amusement ride vehicle comprises a body with a passenger seating area for one or more passengers, and a wheeled-chassis which follows a predetermined path. The path may comprise a roadway or other surface upon which wheels of the chassis are in rolling contact. In some cases, the passenger is allowed to take a minor role in directing the travel of the vehicle, for example, by steering it within a defined lateral range along the path, and by controlling its rate of speed. To limit the lateral travel of the vehicle with respect to the path, a vertical rail or the like may be connected to the center of the path throughout its length, with at least two wheels of the vehicle riding on opposite sides of the rail. When the lateral travel of the vehicle approaches the limit defined by the rail, a stop or other means on the vehicle will contact the rail to prevent further lateral travel.

While ride vehicles of the type described above have the desirable feature that the vehicle can travel in a lateral direction as it moves along the path, such vehicles are not without certain recognized limitations and drawbacks. For example, the range of lateral travel of the vehicle with respect to the path generally is limited by the lateral distance between the pair of wheels on the vehicle that straddle the vertical rail on the path. Therefore, in order to provide a wider range of lateral travel, the distance between the pair of wheels on the vehicle necessarily must be wider. In addition, when the maximum range of lateral travel has been reached, the force generated by the impact between the vertical rail and the stop on the vehicle can be significant. Oftentimes, the impact results in an unpleasant jolt to the passengers in the vehicle. This may expose the passengers to an unacceptable safety risk if proper precautions are not taken.

In other cases, the lateral travel of the vehicle may be limited by vertical walls that border the path and thereby define its width. When the vehicle travels too far laterally with respect to the path, the vehicle will collide with one of the vertical walls to prevent it from leaving the path. Since the danger of head-on collisions between the vehicle and the vertical walls presents unacceptable safety risks, the width of the path, as defined by the lateral distance between the two vertical walls, necessarily must be quite limited to prevent such head-on collisions or collisions at other angles that expose the passengers to unacceptable safety risks. In any event, when lateral travel of the vehicle results in contact between the vehicle and one of the vertical walls, the passengers typically receive an unpleasant jolt which detracts from the ride experience.

Accordingly, there has existed a definite need for an amusement ride vehicle that permits an increased amount of lateral travel of the vehicle with respect to its path, without exposing the passengers to unpleasant jolts or unacceptable or undesirable safety risks. The present invention satisfies these and other needs and provides further related advantages.

SUMMARY OF THE INVENTION

The present invention is embodied in a lateral energy absorbing device for use in a ride vehicle. The ride vehicle may be designed for use in an amusement park attraction or similar environment for entertaining guests visiting the attraction. The vehicle itself includes a vehicle chassis with a driver for moving the vehicle along a path. The vehicle also includes a vehicle body having an area for holding one or more passengers.

In accordance with one embodiment of the invention, the lateral energy absorbing device comprises an actuator having one end pivotally connected to the vehicle chassis and another end pivotally connected to a follower apparatus designed to follow a predetermined route along the path. When the lateral motion of the vehicle with respect to the path reaches a predetermined limit, an energy absorbing means on the actuator is designed to prevent further lateral travel of the vehicle with respect to the path and to absorb lateral kinetic energy that is generated during the process.

In one form of the invention, the lateral energy absorbing device comprises an actuator having a front end pivotally connected to the vehicle chassis and a rear end pivotally connected to the follower apparatus. The rear end of the actuator connected to the follower apparatus also has an energy absorbing member connected to it.

The actuator is designed to operate in two distinct modes. These modes comprise a first mode, in which the rear end of the actuator is extended, and a second mode, in which the rear end of the actuator is retracted. Since the energy absorbing member is connected to the rear end of the actuator, it also is extended and retracted.

When the actuator operates in the first mode, the energy absorbing member is extended to a position between two oppositely facing first plates on the vehicle chassis. These first plates confine the range of lateral motion of the energy absorbing member to a first distance corresponding to the distance between the first plates. When the actuator operates in the second mode, the energy absorbing member is retracted to a position between a pair of oppositely facing second plates on the vehicle chassis. Like the first plates, the second plates confine the range of lateral motion of the energy absorbing member to a second distance corresponding to the distance between the second plates. In one embodiment, the second distance is greater than the first distance.

When the vehicle is required to follow a substantially linear direction along the path, or a direction along the path with relatively shallow curves, it may be desirable to allow the chassis to move laterally only a limited distance with respect to the path. In these circumstances, the actuator may operate in the first mode, in which the energy absorbing member is confined between the first plates and only able to move laterally by the smaller, first distance. However, when the vehicle is required or allowed to follow a direction along the path with relatively sharp curves, requiring increased lateral travel with respect to the path, the actuator may operate in the second mode. In the second mode, the energy absorbing member is permitted to move laterally by an increased distance corresponding to the second distance between the second plates.

In one aspect of the invention, the lateral energy absorbing device includes a sensor designed to sense the amount of lateral motion of the energy absorbing member. Upon movement of the energy absorbing member, the sensor sends signals to a ride control computer on the vehicle corresponding to the amount of lateral travel of the energy absorbing member. In one embodiment, the sensor is coupled to a vertical pivot shaft that connects the front end of the actuator to the chassis. When the actuator pivots with respect to the chassis, the sensor senses the amount of angular motion of the pivot shaft. This angular motion corresponds to the amount of lateral travel of the energy absorbing member at the rear end of the actuator. Based upon the signals generated and sent by the sensor to the ride control computer, the computer can determine when the energy absorbing member is about to contact either the first or second plates, depending on the mode of the actuator.

If desired, the ride control computer can be designed to cause an emergency stop and completely disable operation of the vehicle under certain circumstances. For example, when the sensor indicates that the lateral travel of the vehicle has reached a predetermined maximum distance, preferably corresponding to a point just prior to the energy absorbing member contacting either the first or second plates, the ride control computer can disable operation of the vehicle. In some situations, even though operation of the vehicle has been disabled, the momentum of the vehicle will still cause it to continue to move laterally across the path. In these situations, the energy absorbing member will contact either the first or second plates and absorb the lateral kinetic energy that is generated. By disabling operation of the vehicle and absorbing the lateral kinetic energy, unpleasant jolts to the passengers can be minimized, while providing the highest degree of safety.

In another aspect of the invention, the actuator comprises a hydraulic actuator that is moved to the extended and retracted positions by a hydraulic control system on the vehicle. This hydraulic control system may be operated based on commands provided by the ride control computer.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 9 is a schematic top plan view illustrating the principles of operation of the lateral energy absorbing device of FIG. 8.

DESCRIPTION OF THE PREFERRED EMBODIMENTS

Figure 1:
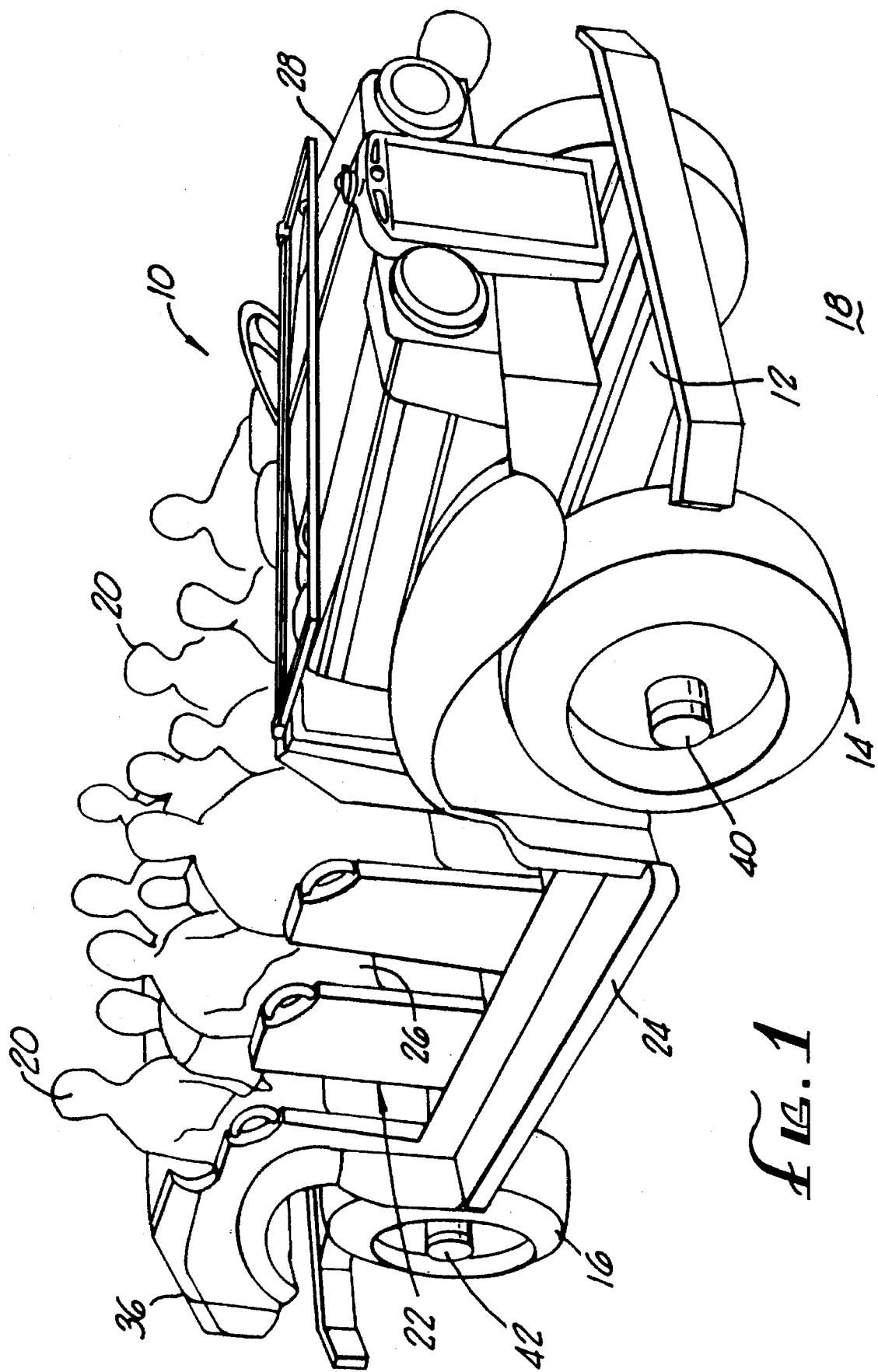
FIG. 1 is a perspective view of a vehicle having a lateral energy absorbing device embodying the novel features of the present invention.

FIG. 1 shows an exemplary ride vehicle embodying the lateral energy absorbing device Of the present invention. This ride vehicle, referred to generally by the reference numeral 10, can be adapted for use in entertaining and amusing guests in an amusement park attraction or other appropriate environment. The ride vehicle 10 comprises a movable chassis 12 having a plurality of wheels, including a pair of front wheels 14 and a pair of rear wheels 16 for moving the vehicle along a path 18. The guests or passengers 20 may be seated in a passenger seating area 22 in a vehicle body 24 connected to the chassis 12.

The vehicle body 24 may comprise various forms and can take on a configuration that is themed to a selected environment. For example, the body 24 can be configured to resemble a transportation vehicle, such as an all-terrain vehicle, a jeep, a car or truck, or various other forms of on or off-road transportation vehicles. Alternatively, the body 24 can be configured to resemble an animal or other object. Various other body shapes may be employed as desired.

Figure 2:
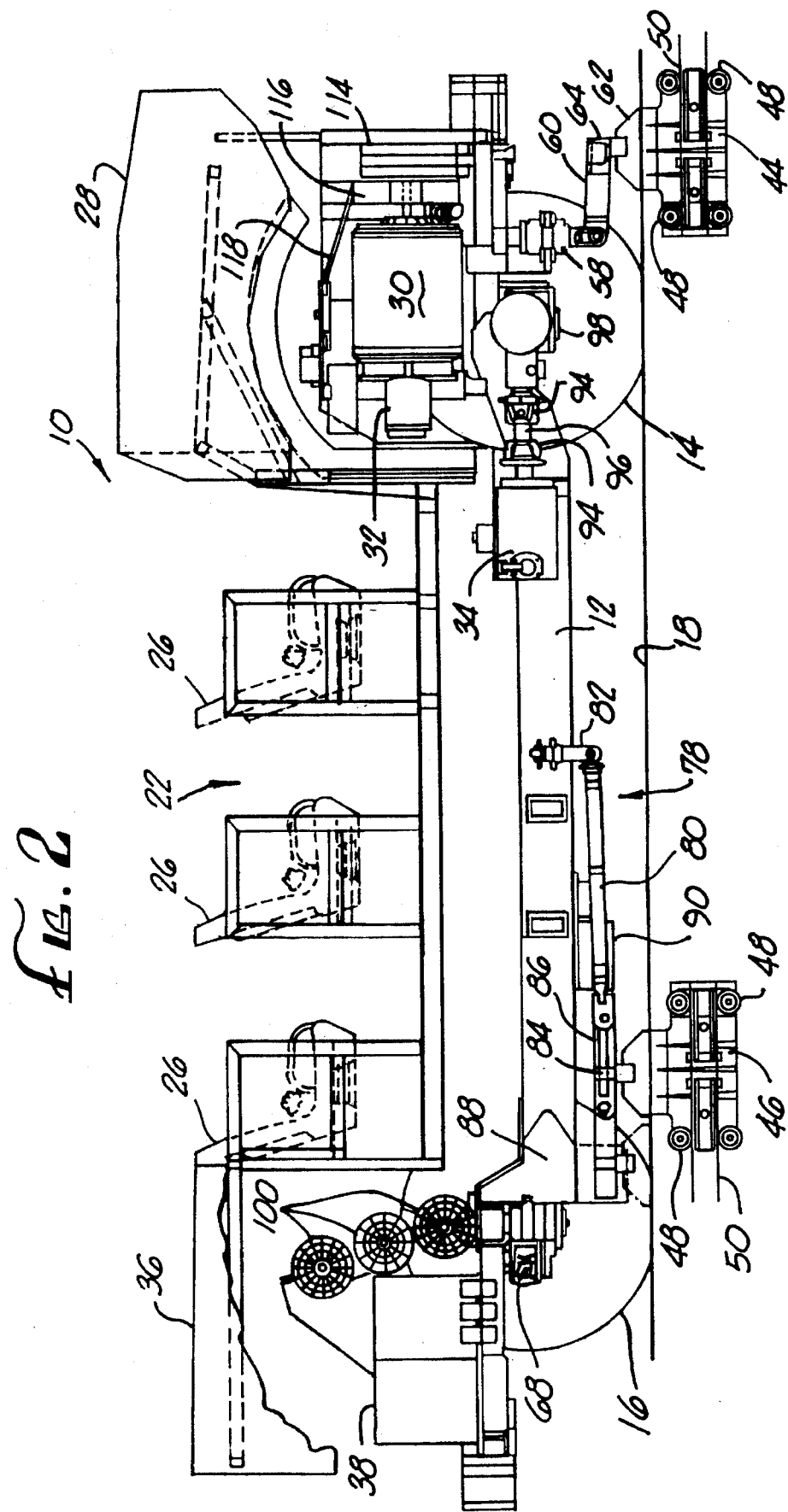
FIG. 2 is a cross-sectional elevational view of the vehicle, showing the lateral energy absorbing device connected between a vehicle chassis and a path followed by the vehicle.

The passenger seating area 22 also can take various forms depending on the configuration of the body 24. For example, as shown in FIGS. 1–2, the passenger seating area may comprise several rows of seats 26. Passenger restraints can be provided to restrain the passengers 20 and confine them safely in their seats 26 during vehicle motion. A suitable passenger restraint system is disclosed and claimed in U.S. Pat. No. 5,182,836.

The front portion of the body 24 includes a hood 28 which encloses the major power components of the vehicle 10, such as an electric motor 30, a hydraulic power unit 32 and a hydraulic propulsion motor 34. The hydraulic propulsion motor 34 functions as a driver to put the chassis 12 in motion along the path 18. It will be appreciated that other suitable drivers may be used to put the chassis 12 in motion, such as externally driven towing mechanisms, linear induction motors, combustion engines, electric motors, cables, platen drives, and other suitable propelling devices, including gravity. The rear portion of the body 24 includes a trunk area 36 enclosing a controller 38, such as a computer, for controlling the vehicle's power components and other systems.

The chassis 12 has a front axle 40 and a rear axle 42, with the front and rear wheels 14 and 16 connected to opposite ends of each axle, respectively. Each wheel 14 and 16 is equipped with a suitable tire, such as an inflatable tire or the like. In one embodiment, the front wheels 14 and the rear wheels 16 each have a separate steering system which allows these four wheels to be steered independently of each other. This provides a steering system that is capable of allowing the vehicle 10 to move laterally with respect to the path 18. It will be appreciated that other forms of steering systems may be employed to provide lateral motion of the vehicle 10 with respect to the path 18. Therefore, the steering systems described below are for purposes of illustration only and not by way of limitation.

Before proceeding to a discussion of the steering systems, it is first necessary to describe the follower apparatus that is used to link the vehicle 10 to the path 18. As shown in FIG. 2, for example, the follower apparatus includes two bogies comprising a front bogie 44 and a rear bogie 46. These two bogies 44 and 46 are essentially the same and have several sets of wheels 48 for rolling engagement with a pair of spaced, parallel rails 50 positioned under the path 18 on which the vehicle 10 travels. These sets of wheels 48 securely attach the bogies 44 and 46 to the rails 50. If desired, one of the bogies 44 and 46 may be provided with bus bar collectors or other suitable means for accessing electrical power to operate the electric motor 30 and other control systems and components of the ride vehicle 10.

As mentioned above, steering of the ride vehicle's front and rear wheels 14 and 16 to provide lateral motion of the vehicle 10 with respect to the path 18 may be accomplished in a number of different ways. By way of example, as shown best in FIGS. 2–3, the vehicle's front wheels 14 may be steered by a mechanical steering system that uses the curvature of the path 18 to steer the front wheels. In this system, the two front wheels 14 are linked together by a linkage arm 52, such that steering motion of one front wheel 14 is automatically transferred via the linkage arm 52 to the other front wheel 14. The two ends of the linkage arm 52 may be connected to the front wheels 14 by conventional ball and joint connections.

One of the front wheels 14, such as the right-front wheel, is connected by a steering bar 54 to an upper steer arm 56 via ball and joint connections. The upper steer arm 56 is connected by a vertical shaft 58 to a lower input arm 60 such that horizontal pivoting motion of the lower input arm 60 about the axis of the vertical shaft 58 is directly translated into corresponding horizontal pivotal movement of the upper steer arm 56. The lower end of the shaft 58 is pivotally connected to the lower input arm 60 to accommodate up and down movement of the lower input arm caused by the grade change of the path 18. The lower input 60 arm is, in turn, bolted to the front bogie 44 via a front follower 62 and a plain spherical bearing 64.

With the foregoing steering arrangement, steering of the front wheels 14 is governed by the curvature of the path 18. The curvature of the path 18 may be defined by a channel 66 (see FIGS. 5–6) located at the center of the path 18 and running throughout the length of the path. The front follower 62 of the front bogie 44 protrudes through a gap in the path 18 created by the channel 66 for connection to the lower input arm 60 of the front steering system, as described above.

Using this front steering arrangement, on a straight path, the front wheels 14 of the vehicle 10 will point straight ahead. However, when the front bogie 44 follows a turn in the path 18 corresponding to the curvature of the underground rails 50, and the corresponding curvature of the channel 66, the lower input arm 60 is pivoted based upon the non-linear movements of the front bogie 44. This pivoting motion of the lower input arm 60 is transferred via the vertical shaft 58 to the upper steer arm 56, which in turn, moves the steering bar 54 causing the right-front wheel 14 to steer in the direction of the path turn. This steering motion of the right-front wheel 14 is transferred via the linkage arm 52 to the left-front wheel 14 to provide coordinated steering of the two front wheels in unison. Pivoting motion of the upper steer arm 56 may limited by appropriate bumpers (not shown) to thereby limit vehicle front end lateral motion with respect to the path 18.

Steering of the rear wheels 16 can be independent of steering of the front wheels 14 to provide increased versatility of motion of the ride vehicle 10. Referring again to FIG. 3, the steering of each rear wheel 16 may be controlled by separate hydraulic steering servo actuators 68. These steering actuators 68 are connected to a hydraulic control system of the vehicle 10 and are controlled by the controller 38. The controller 38 regulates the flow of hydraulic fluid to these steering actuators 68 based on feedback signals from appropriate sensors 70 placed on the steering actuators. In this way, extension and retraction of the steering actuators 68 and, thus, the steering of the rear wheels 16, is accomplished.

More particularly, the inner ends of the rear steering actuators 68 may be mounted by brackets 72 with pivotal connections to the vehicle's rear axle beam 74. The outer ends of the steering actuators 68 can be mounted via plain bearings to trunion mountings 76 adjacent to the rear axle 42. The steering actuators 68 are provided with hydraulic fluid from the hydraulic control system through appropriate tubing.

It will be appreciated that steering of the front wheels 14 may be carried out in the same manner as the steering of the rear wheels 16, by using separate front steering servo actuators.

The foregoing exemplary embodiment of the ride vehicle 10 provides the vehicle with steering capabilities that allow the vehicle to traverse a wide range of lateral travel with respect to the path 18. If a mechanical front steering mechanism is used, as described above, the front end of the vehicle 10 will follow the direction of the path 18 defined by the channel 66. Lateral movement of the front end of the vehicle 10 is limited to that which is required to steer the front wheels 14 (about±1 ft.) However, as the vehicle 10 moves in a forward direction along the path 18, the rear wheels 16 may be steered to cause the rear end of the vehicle to move laterally with respect to the path. While lateral motion of the vehicle 10 with respect to the path 18 is desirable under certain circumstances, this lateral motion must be confined within acceptable ranges for purposes of passenger safety and other reasons. This is the purpose of the lateral energy absorbing device, indicated generally by the reference numeral 78.

In accordance with the invention, the lateral energy absorbing device 78 on the vehicle 10 allows the vehicle to move laterally with respect to the path 18 within a predetermined tracking envelope during movement of the vehicle along the path. In the event that the vehicle 10 attempts to exceed the tracking envelope, the lateral energy absorbing device 78 prevents further lateral movement of the vehicle and absorbs lateral loads that are created in the process of limiting that lateral motion. If desired, under certain circumstances, the lateral energy absorbing device 78 also may disable operation of the vehicle 10. In this way, the passengers 20 in the vehicle 10 will not be subjected to unsafe accelerations, jerks or other violent impacts that may be created when the vehicle moves laterally beyond specified limits. This provides a substantially more enjoyable and safe ride for the passengers 20.

In one embodiment of the invention, the lateral energy absorbing device 78 comprises a connector in the form of an actuator 80 having its front end pivotally connected to the chassis 12 by a vertical pivot shaft 82. The rear end of the actuator 80 is pivotally connected to the rear bogie 46 by a vertical pivot shaft 84 extending through the channel 66 in the path 18. An energy absorbing member 86 is connected to the rear end of the actuator 80. In one embodiment, the energy absorbing member 86 comprises a cylindrically shaped pad that fits over the vertical pivot shaft 84 of the rear bogie 46. In one form, the energy absorbing member 86 can be constructed from urethane. Other suitable energy absorbing materials may be used as desired.

The size of the energy absorbing member 86 can be adjusted depending upon the magnitude of the lateral loads that need to be absorbed. In one form of the vehicle 10, the energy absorbing member 86 needs to be able to absorb lateral loads in the range of about 10,000–15,000 pounds. A suitable energy absorbing member 86 adapted to meet these requirements has a radial thickness of about four inches. The energy absorbing member 86 also has a central hole so that the member can be mounted on a two-inch diameter vertical pivot shaft 84 which connects the rear end of the actuator 80 to the rear bogie 46. Thus, the total diameter of the energy absorbing member 86 is approximately ten inches. A retaining ring (not shown) or other suitable means may be used to secure the energy absorbing member 86 to the vertical pivot shaft 84.

In the preferred embodiment, the actuator 80 comprises a hydraulic actuator that is designed to operate in two distinct modes. These two modes comprise a first or extended mode, in which the rear end of the actuator 80 is extended, and a second or retracted mode, in which the rear end of the actuator 80 is retracted. Since the energy absorbing member 86 is connected to the rear end of the actuator 80, it also is extended and retracted during movement of the actuator between the first and second modes.

Figure 3:
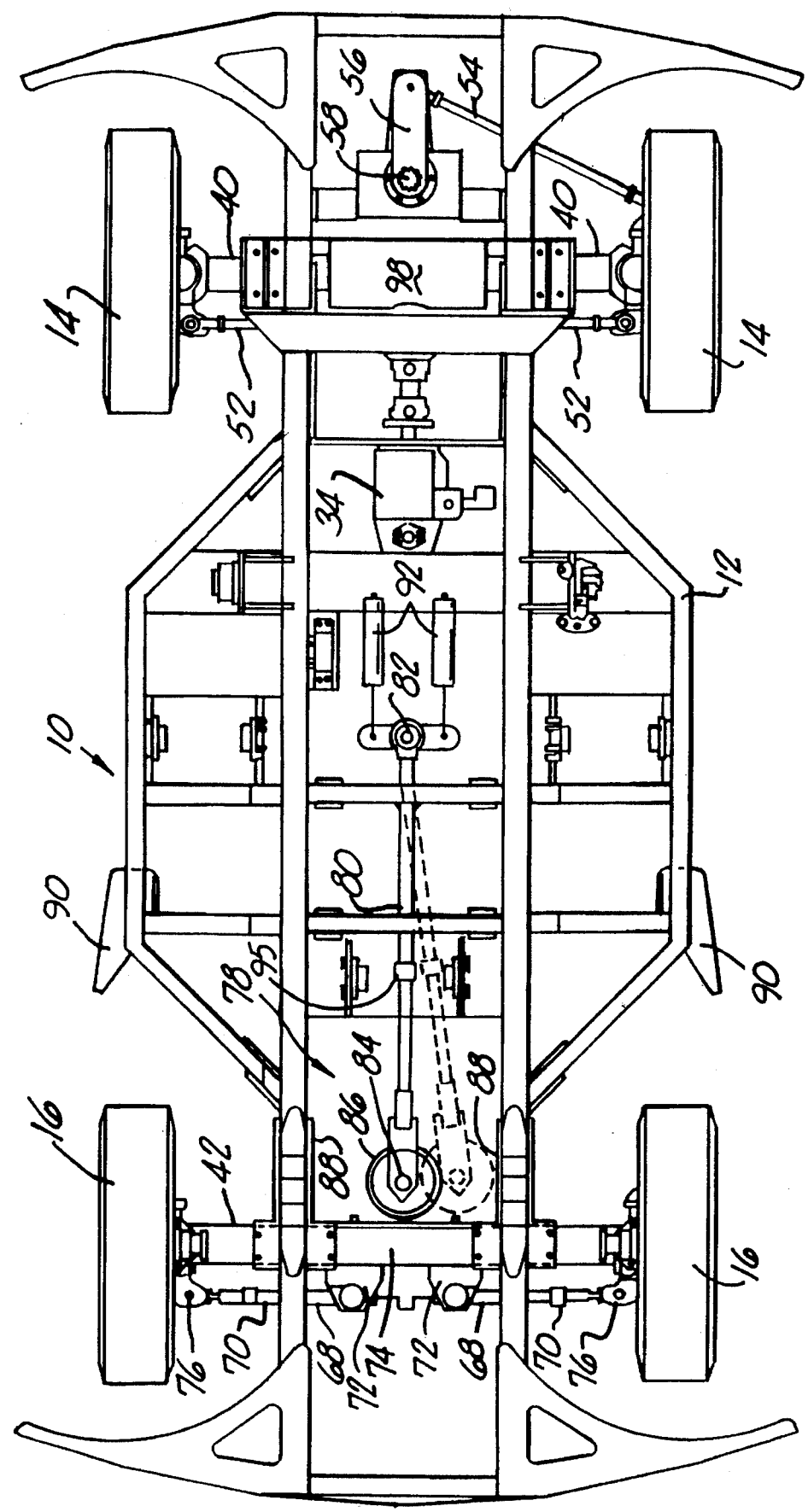
FIG. 3 is top plan view of the vehicle chassis, showing the lateral energy absorbing device in a first operational position.

FIG. 3 shows the actuator 80 extended to operate in the first mode. In this first mode, the energy absorbing member 86 is extended to a position between two oppositely facing first plates 88 on the chassis 12. These first plates 88 confine the range of lateral motion of the energy absorbing member 86 to a first distance equal to the distance between the first plates 88. The actuator 80 is placed in the first mode when limited lateral travel of the vehicle 10 is desired.

Figure 4:
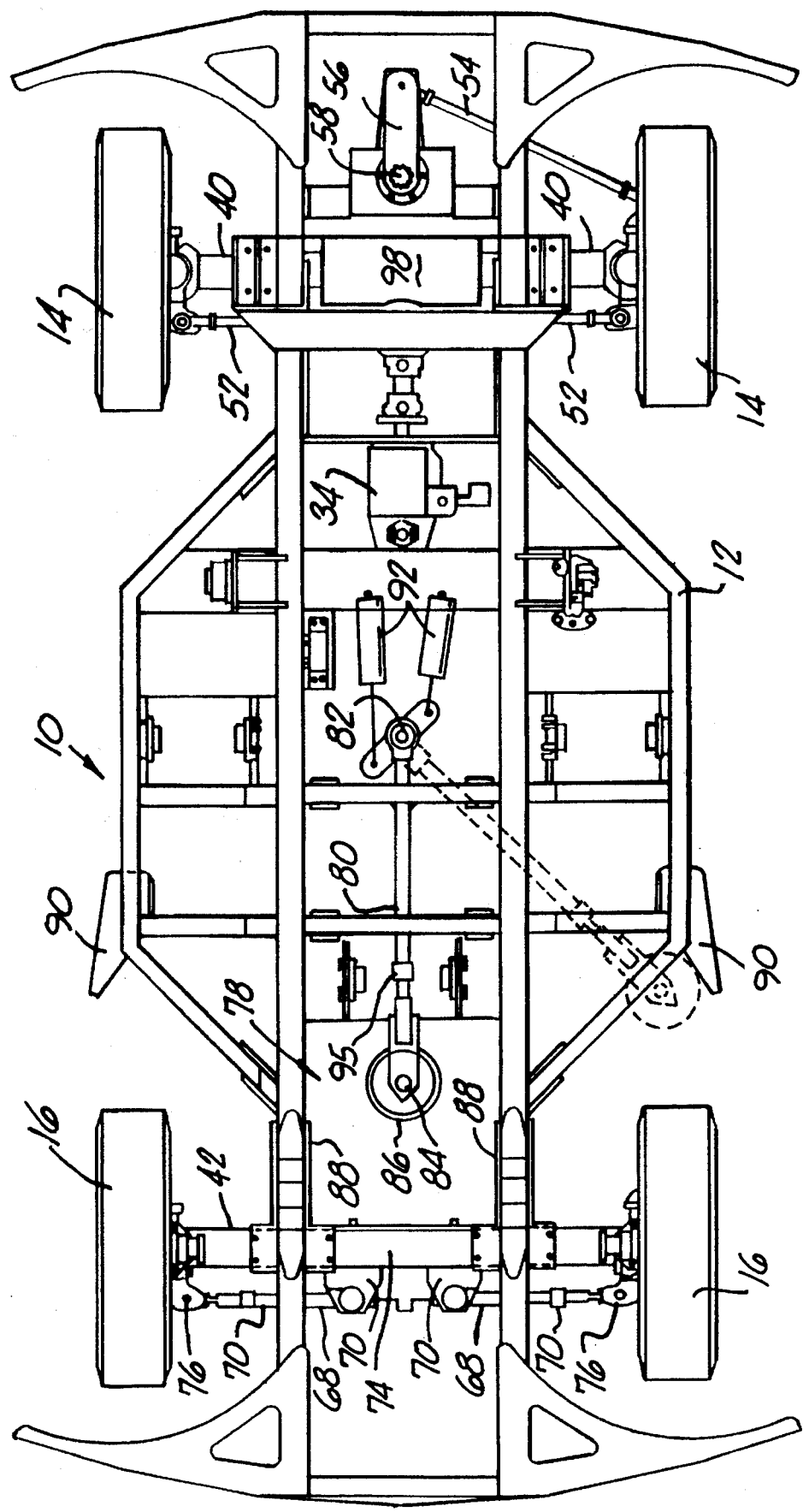
FIG. 4 is another top plan view of the vehicle chassis, similar to FIG. 3, showing the lateral energy absorbing device in a second operational position.

FIG. 4 shows the actuator 80 retracted to operate in the second mode. In the second mode, the energy absorbing member 86 is retracted to a position between a pair of oppositely facing second plates 90 on the chassis 12. Like the first plates 88, the second plates 90 confine the range of lateral motion of the energy absorbing member 86 to a second distance equal to the distance between the second plates. However, the second distance is greater than the first distance. This allows increased lateral travel of the vehicle 10.

Depending upon the environment in which the ride vehicle 10 operates, such as in an amusement park attraction, it may be desirable to limit the lateral motion of the vehicle with respect to the path 18 within predetermined ranges. Upon determining the amount of lateral travel that is to be permitted, the actuator 80 of the lateral energy absorbing device 78 can be controlled to operate in either the first mode or the second mode.

Figure 5:
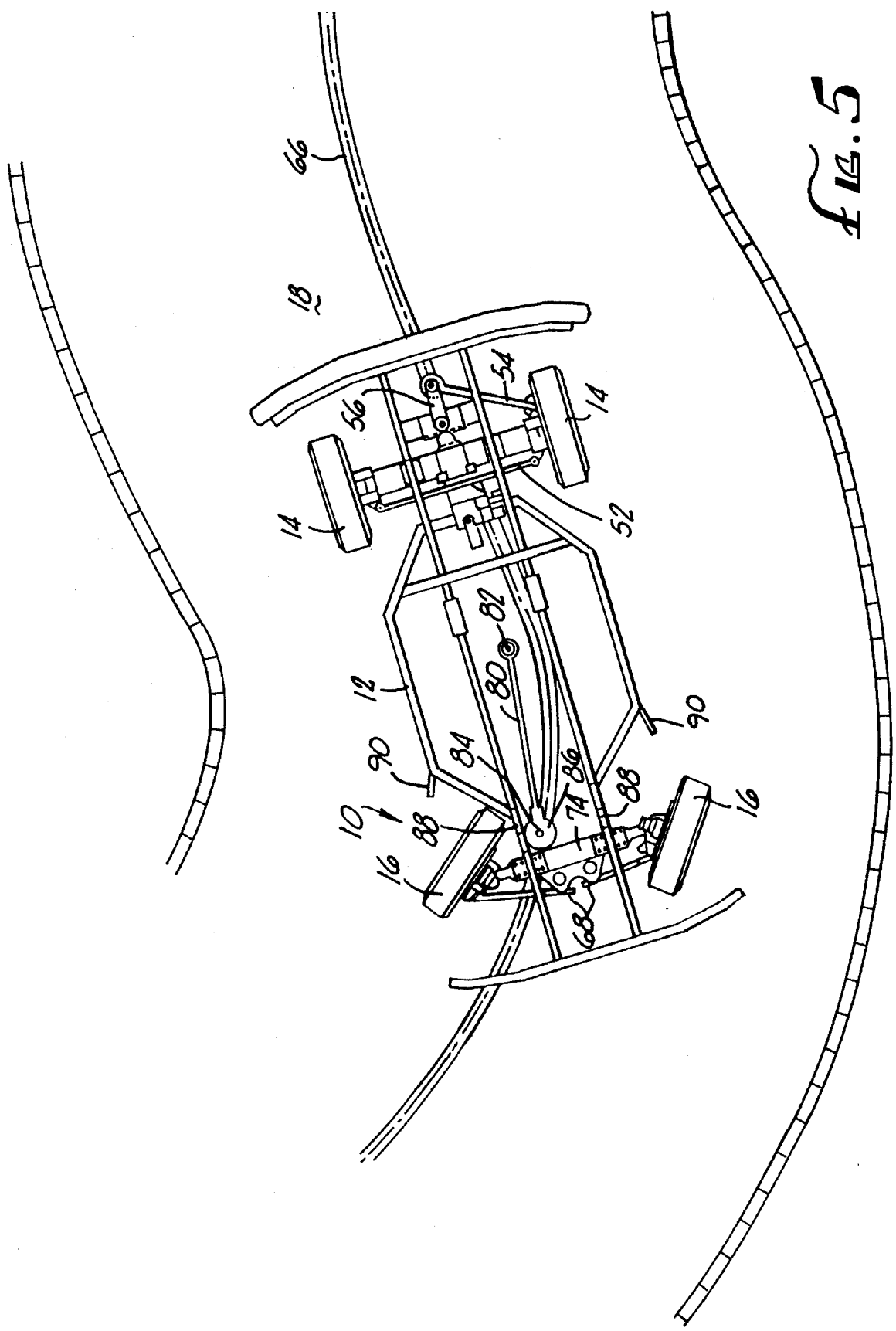
FIG. 5 is top plan view of the vehicle chassis, showing the amount of lateral travel of the vehicle with respect to the path that is permitted when the lateral energy absorbing device is in the first operational position.

FIG. 5 illustrates one example of a situation where the lateral motion of the vehicle 10 with respect to the path 18 must be relatively limited. These situations can occur when the vehicle 10 is required to follow a substantially linear direction along the path 18, or a direction along the path with relatively shallow curves. In these circumstances, the actuator 80 operates in the first mode, with the energy absorbing member 86 confined between the first plates 88. As a result, the vehicle 10 is only able to move laterally with respect to the path 18 by the smaller, first distance.

Figure 6:
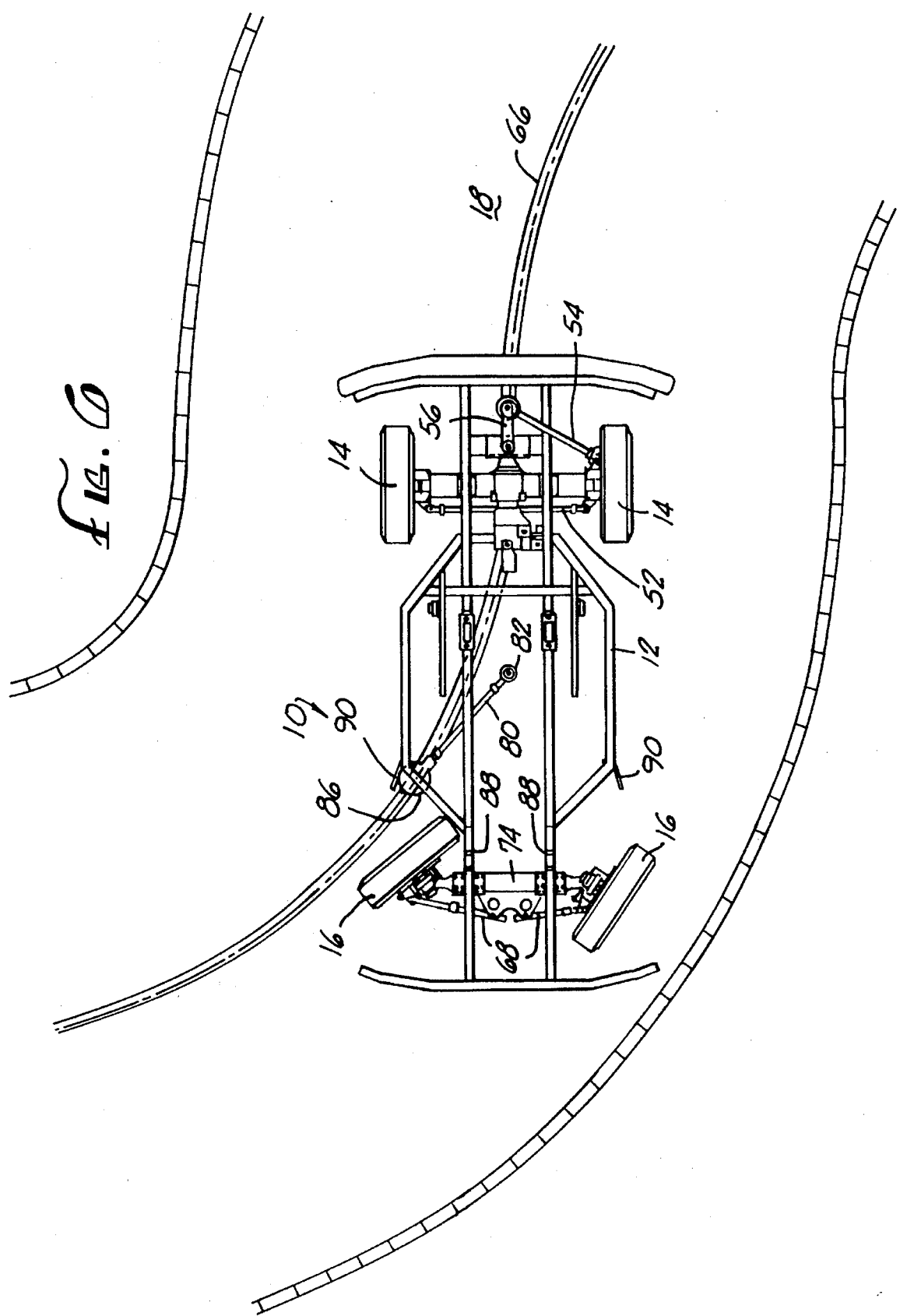
FIG. 6 is another top plan view of the vehicle chassis showing the amount of lateral travel of the vehicle with respect to the path that is permitted when the lateral energy absorbing device is in the second operational position.

FIG. 6 illustrates an example of a different situation where it is desirable to have the vehicle 10 move laterally with respect to the path 18 by greater distances. These situations can occur when the vehicle 10 is required or allowed to make wide turns or to follow a direction along the path 18 with relatively sharp curves. In these circumstances, the actuator 80 operates in the second mode, with the energy absorbing member 86 retracted and confined between the second plates 90. As a result, the vehicle 10 is permitted to move laterally with respect to the path 18 by the increased second distance.

The lateral energy absorbing device 78 may be provided with a sensor 92 designed to sense the amount of lateral motion of the energy absorbing member 86 relative to the chassis 12. In one embodiment, shown in FIGS. 2–4, the sensor 92 comprises a linear sensor that measures the amount of angular motion of the actuator 80 with respect to the chassis 12. The sensor 92 preferably is coupled to a tab 93 the vertical pivot shaft 82 which connects the front end of the actuator 80 to the chassis 12. When the actuator 80 pivots with respect to the chassis 12, upon lateral motion of the energy absorbing member 86, the sensor 92 senses the amount of angular motion of the tab 93 and thus the pivot shaft 82. This angular motion corresponds to the amount of lateral travel of the energy absorbing member 86 at the rear end of the actuator 80.

The actuator 80 also includes a second sensor 95, which may be incorporated into the actuator, to sense whether the actuator is operating in either the first mode (actuator extended) or the second mode (actuator retracted).

The sensors 92 and 95 are designed to generate signals corresponding to the degree of angular motion of the vertical pivot shaft 82 and the mode of the actuator 80. These signals can be sent to a ride control computer 38 on the vehicle 10 for monitoring operation of the vehicle. Based upon the combined signals generated and sent by the sensors 92 and 95 to the ride control computer 38, the computer can monitor the position of the energy absorbing member 86 and determine when the energy absorbing member is about to contact either the first or second plates 88 or 90, depending upon the mode of the actuator 80 at the time.

The ride control computer 38 preferably programs the vehicle 10 to operate such that the lateral motion of the vehicle will not exceed a predetermined distance and cause the energy absorbing member 86 to contact either the first or second plates 88 or 90. This can be accomplished by having the ride control computer 38 govern appropriate vehicle functions, such as vehicle velocity, steering of the rear wheels 16 and other vehicle components. However, if the signals sent by the sensors 92 and 95 to the ride control computer 38 indicate that the energy absorbing member 86 has exceeded the predetermined distance, the ride control computer can be programmed to cause an emergency stop and completely disable operation of the vehicle 10. This includes disabling power to the hydraulic propulsion motor 34 which propels the vehicle 10 along the path 18.

In some situations, depending upon the velocity of the vehicle 10 at the time, the momentum of the vehicle will still cause it to continue to move laterally with respect to the path 18. Although operation of the vehicle 10 has been disabled, and the vehicle is not being propelled by the hydraulic propulsion motor 34, the momentum of the vehicle will cause the energy absorbing member 86 to contact either the first or second plates 88 or 90 and absorb the lateral kinetic energy that is generated by this contact. However, disabling operation of the vehicle 10 before this contact helps reduce the amount of lateral kinetic energy that is generated. This helps minimize unpleasant jolts to the passengers 20 and increases passenger-safety. Moreover, the cushioning effect provided by the energy absorbing member 86 further minimizes the impact on the passengers 20.

Figure 7:
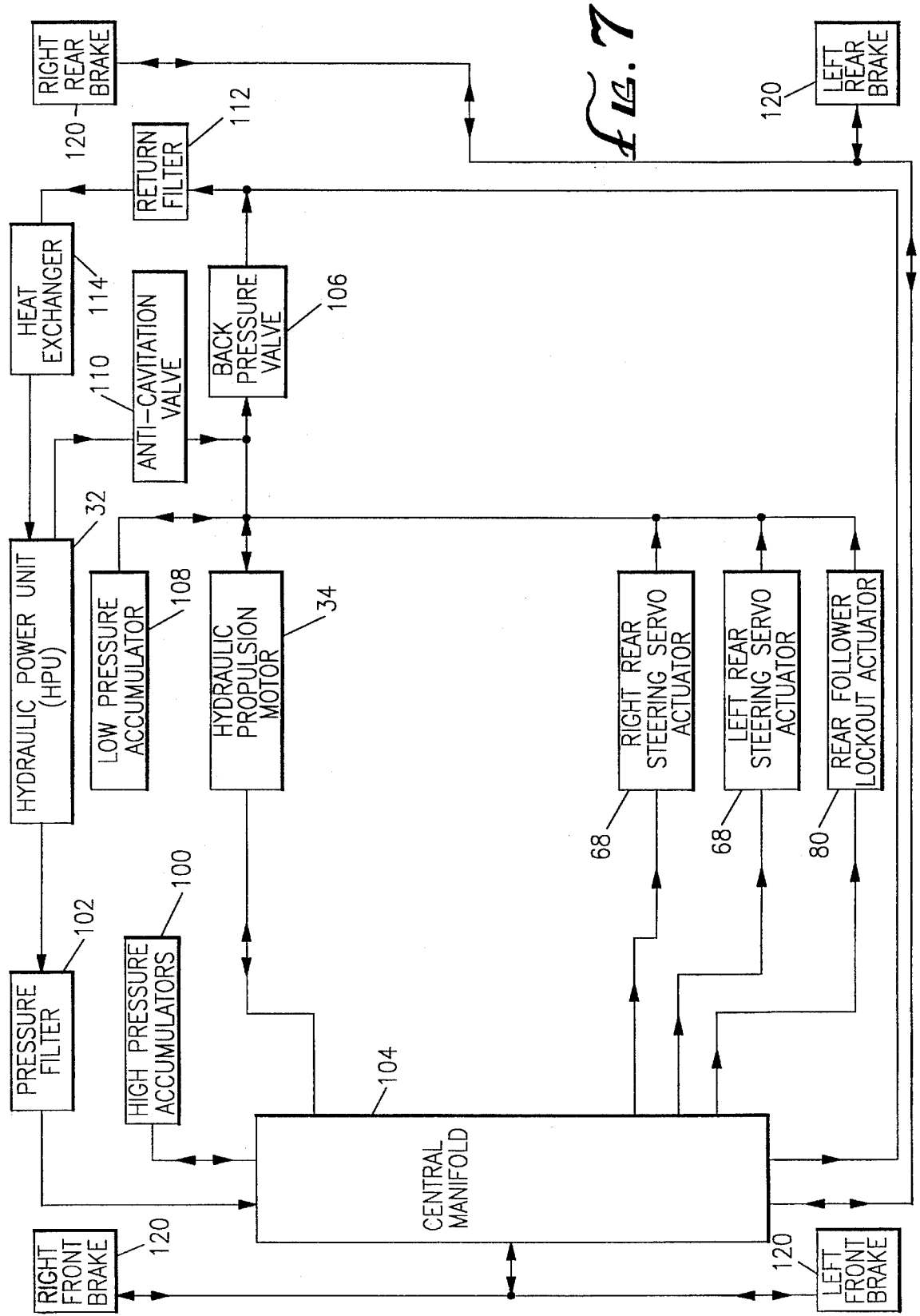
FIG. 7 is a block diagram of a hydraulic control system for operating the vehicle and certain aspects of the lateral energy absorbing device.

FIG. 7 is a block diagram that illustrates one example of a hydraulic control system for providing hydraulic power to the actuator 80 of the lateral energy absorbing device 78. The hydraulic control system also provides hydraulic power to the rear steering actuators 68 and other components of the ride vehicle 10. As noted above, a suitable electrical power supply can be tapped from a bus bar or other suitable means for driving the electric motor 30, which in turn drives the hydraulic power unit 32. The hydraulic power unit 32 is responsible for providing the energy for all of the vehicle's hydraulic actuators, and to operate the hydraulic propulsion motor 34.

As shown in FIGS. 3–4, the output of the hydraulic propulsion motor 34 is connected to a differential ratio gear 98 box to produce an output for driving the front wheels 14. The hydraulic propulsion motor 34 may comprise a variable displacement hydraulic motor with a tachometer to measure the propulsion motor's output shaft rpms. This information is sent to the vehicle's ride control computer 38 which monitors the motor's speed, while stroke displacement transducers govern hydraulic displacement of the propulsion motor's pistons to provide for controlled acceleration, deceleration and velocity of the vehicle 10.

The primary function of the hydraulic power unit 32 is to charge high pressure accumulators 100 with hydraulic energy. FIG. 2 shows the location of these accumulators 100 at the rear of the vehicle 10. The hydraulic power unit 32 supplies this hydraulic energy by pumping hydraulic fluid through a pressure filter 102 to a central manifold 104 and subsequently to the high pressure accumulators 100. The primary function of the high pressure accumulators 100 is to store and save energy for supply on demand to the various energy users of the hydraulic system, such as the steering servo actuators 68 and the actuator 80 of the lateral energy absorbing device 78. Each of these actuators 68 and 80 has a servo valve which controls the flow of hydraulic fluid to the actuators according to a command from the ride control computer 38.

The hydraulic control system also includes a back pressure valve 106 that maintains a predetermined amount of back pressure in a low pressure accumulator 108. The low pressure accumulator 108 is designed to store extra hydraulic fluid that may be needed by the hydraulic power unit 32 when the vehicle 10 is decelerating. An anti-cavitation valve 110, a return filter 112 and a heat exchanger 114 also are provided to complete the hydraulic control system. In addition, a cooling fan 116 and a shroud 118 direct airflow through the heat exchanger 114 and over the electric motor 30 for cooling purposes, as illustrated in FIG. 2. Fail-safe brakes 120 also can be provided for the vehicle 10.

Figure 8:
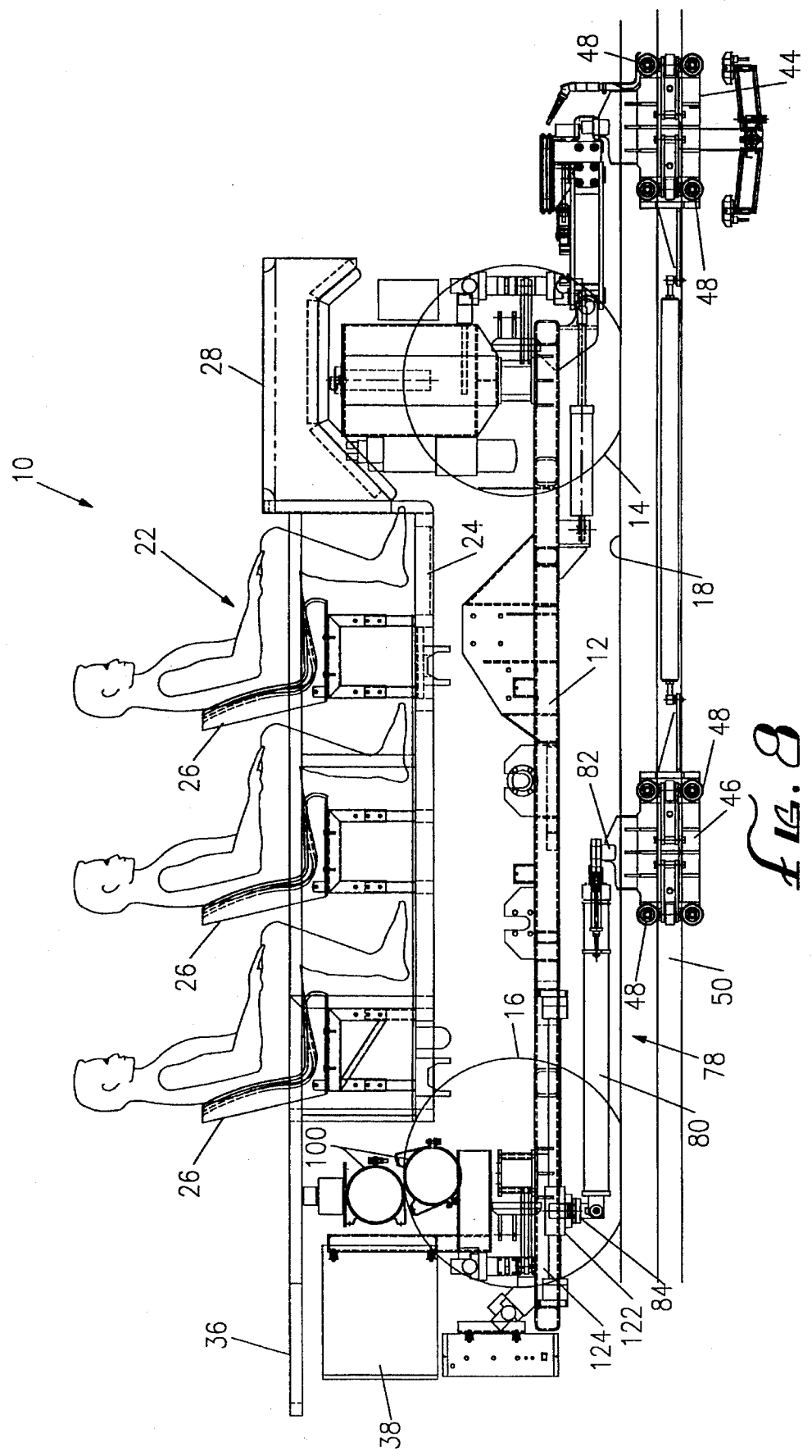
FIG. 8 is a cross-sectional elevational view of another embodiment of a lateral energy absorbing device.

FIGS. 8–9 illustrate another embodiment of the lateral energy absorbing device 78. In this embodiment, the vehicle 10 also is linked to the path 18 by the front and rear bogies 44 and 46. However, the actuator 80 of the lateral energy absorbing device 78 is connected between the rear bogie 46 and the chassis 12 in a different orientation. Here, the front end of the actuator 80 is pivotally connected to the rear bogie 44, and the rear end of the actuator is connected to the chassis 12 by a sliding bracket 122. This bracket 122 is adapted to slide longitudinally on bars 124 along the chassis 12.

The actuator itself comprises a shock absorber that is a passive component during the normal operation of the vehicle 10. However, during a failure or malfunction condition, or when the vehicle 10 has exceeded a specified distance, the lateral energy absorbing device 78 is activated. This activation occurs when the vehicle 10 moves laterally with respect to the path 18 beyond a predetermined distance, causing the actuator 80 to absorb the lateral loads. (See FIG. 9).

When the limit of lateral motion of the vehicle 10 exceeds the predetermined distance, operation of the vehicle can be disabled by the ride control computer 38, in the same manner described above in connection with the embodiment shown in FIGS. 1–7. The shock absorbing capabilities of the actuator 80 are thereafter utilized as necessary to prevent further lateral travel of the vehicle 10 with respect to the path 18, and to absorb any resulting lateral kinetic energy that is developed. Hence, the passengers 20 will not be subject to unsafe accelerations, jerks or other violent movements beyond specified limits necessary to ensure their safety.

While a particular form of the invention has been illustrated and described, it will be apparent that various modifications can be made without departing from the spirit and scope of the invention. Therefore, it is not intended that the invention be limited, except as by the appended claims.

I claim:

1. A lateral energy absorbing device for a vehicle having a chassis adapted to follow a path, wherein the vehicle is permitted to move freely in a lateral direction with respect to a predetermined route along the path, the device comprising an actuator having one end pivotally connected to a follower apparatus adapted to follow the predetermined route along the path, and having another end connected for movement with the chassis along a second route along the path, wherein the actuator includes an energy absorber that operates in a passive mode when the lateral travel of the vehicle with respect to the path is within a predetermined distance, and wherein the actuator operates in an active mode for limiting the lateral travel of the vehicle and for absorbing lateral kinetic energy of the vehicle when the lateral travel of the vehicle with respect to the path exceeds the predetermined distance.

2. A lateral energy absorbing device for a vehicle having a chassis adapted to follow a path that allows the vehicle to move laterally with respect to the path, the device comprising:

(a) a connector having a first end pivotally connected to the vehicle chassis and a second end pivotally connected to a follower apparatus adapted to follow the path;

(b) a pair of stops spaced apart on the chassis for confining and limiting the range of lateral motion of the second end of the connector with respect to the chassis, and thereby limiting the lateral travel of the vehicle with respect to the path; and (c) an energy absorber interposed between the second end of the connector and the pair of stops that is adapted to absorb lateral kinetic energy generated when the second end of the connector contacts one of the pair of stops.

3. The device of claim 2, wherein the energy absorber is connected to the second end of the connector.

4. The device of claim 3, wherein the energy absorber comprises an energy absorbing pad.

5. A lateral energy absorbing device for a vehicle having a chassis adapted to follow a path that allows the vehicle to move laterally with respect to the path, the device comprising:

(a) an actuator having one end pivotally connected to the chassis and another end pivotally connected to a follower apparatus adapted to follow the path, wherein the actuator is adapted to be extended and retracted between an extended position and a retracted position;

(b) an energy absorbing member on the actuator that is adapted to move with the actuator between the extended position and the retracted position;

(c) a pair of oppositely facing first plates on the chassis adapted to confine the range of lateral motion of the energy absorbing member to a first distance when the actuator is in the extended position and the energy absorbing member is confined between the first plates; and (d) a pair of oppositely facing second plates on the chassis adapted to confine the range of lateral motion of the energy absorbing member to a second distance when the actuator is in the extended position and the energy absorbing member is confined between the second plates.

6. The device of claim 5, wherein the first distance is less than the second distance.

7. The device of claim 5, further comprising a sensor coupled to the actuator that is adapted to sense the amount of lateral motion of the energy absorbing member with respect to the chassis and to disable motive power to the vehicle when the lateral motion of the energy absorbing member exceeds a predetermined distance.

8. The device of claim 7, wherein the sensor is coupled to a ride control computer on the vehicle and sends signals to the ride control computer corresponding to the amount of lateral travel of the energy absorbing member with respect to the vehicle chassis.

9. The device of claim 8, wherein the sensor is coupled to the one end of the actuator connected to the chassis and is adapted to measure the amount of pivotal movement of the actuator with respect to the chassis.

10. The device of claim 9, wherein the pivotal movement sensed by the sensor causes the sensor to generate and send signals to the ride control computer.

11. The device of claim 5, wherein the energy absorbing member comprises a cylindrical pad constructed from a urethane material.

12. The device of claim 5, wherein the actuator is a hydraulic actuator.

13. A combination comprising a vehicle and a path followed by the vehicle, wherein the vehicle is permitted to move freely in a lateral direction with respect to a predetermined route along the path, the vehicle comprising:

(a) a chassis;

(b) a driver for moving the vehicle along the path, wherein the path is wide enough to permit the vehicle to move freely in the lateral direction with respect to the predetermined route along the path, thereby defining a second route followed by the vehicle along the path;

(c) a body connected to the chassis, wherein the body has an area for holding a passenger;

(d) a follower apparatus adapted to follow the predetermined route along the path; and (e) an actuator having one end pivotally connected to the chassis and another end pivotally connected to the follower apparatus, wherein the actuator includes an energy absorber that operates in a passive mode when the lateral travel of the vehicle with respect to the path is within a predetermined distance, and wherein the actuator operates in an active mode that limits the lateral travel of the vehicle and absorbs lateral kinetic energy of the vehicle when the lateral travel of the vehicle with respect to the follower apparatus exceed the predetermine distance.

* * * * *